(12) United States Patent
Fitzsimmons et al.

(10) Patent No.: US 8,763,445 B2
(45) Date of Patent: Jul. 1, 2014

(54) DETECTING LEAKS IN A FLUID COOLING SYSTEM BY SENSING FOR A DROP OF FLUID PRESSURE IN THE SYSTEM

(75) Inventors: John A. Fitzsimmons, Poughkeepsie, NY (US); Thomas A. Kline, Hopewell Junction, NY (US); Patrick F. White, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/313,046

(22) Filed: Dec. 7, 2011

(65) Prior Publication Data

US 2013/0145615 A1    Jun. 13, 2013

(51) Int. Cl.
*G01M 3/26* (2006.01)

(52) U.S. Cl.
USPC .......................... 73/40.5 R; 73/49.5; D10/85

(58) Field of Classification Search
USPC ........................ 73/40–49.8; D10/85
See application file for complete search history.

(56) References Cited

U.S. PATENT DOCUMENTS

| | | | | |
|---|---|---|---|---|
| 3,090,221 A | * | 5/1963 | Cosby | 73/40 |
| 3,335,753 A | * | 8/1967 | Kiser | 137/624.11 |
| 3,365,949 A | * | 1/1968 | Robinson | 73/715 |
| 3,385,112 A | * | 5/1968 | Pruitt et al. | 73/756 |
| 3,863,504 A | * | 2/1975 | Borsanyi | 73/706 |
| 4,227,420 A | * | 10/1980 | Lamadrid | 73/756 |
| 4,458,523 A | * | 7/1984 | Moyer | 73/49.7 |
| 4,559,034 A | * | 12/1985 | Kirita et al. | 604/522 |
| 4,563,179 A | * | 1/1986 | Sakai | 604/245 |
| 4,834,532 A | * | 5/1989 | Yount | 356/41 |
| 4,840,068 A | * | 6/1989 | Mayhew, Jr. | 73/730 |
| 4,950,244 A | * | 8/1990 | Fellingham et al. | 604/118 |
| 4,998,434 A | * | 3/1991 | Asbra | 73/40.5 R |
| 5,022,271 A | * | 6/1991 | Hannon, Jr. | 73/730 |
| 5,031,460 A | * | 7/1991 | Kanenobu et al. | 73/730 |
| 5,103,211 A | | 4/1992 | Daoud et al. | |
| 5,127,260 A | * | 7/1992 | Robertson | 73/37 |
| 5,154,700 A | * | 10/1992 | Danby | 604/118 |
| 5,209,105 A | * | 5/1993 | Hasha et al. | 73/49.1 |
| 5,333,115 A | | 7/1994 | Clouser et al. | |
| 5,408,420 A | | 4/1995 | Slocum et al. | |
| 5,410,916 A | * | 5/1995 | Cook | 73/706 |
| 5,448,907 A | * | 9/1995 | Jensen et al. | 73/38 |
| 5,483,838 A | * | 1/1996 | Holden | 73/861.61 |
| 5,646,352 A | * | 7/1997 | Joseph et al. | 73/756 |
| 5,667,622 A | * | 9/1997 | Hasegawa et al. | 156/345.27 |
| 5,716,342 A | * | 2/1998 | Dumbraveanu et al. | 604/118 |
| 5,723,770 A | * | 3/1998 | Ertola | 73/41 |
| 5,753,798 A | * | 5/1998 | Engeler et al. | 73/35.13 |

(Continued)

FOREIGN PATENT DOCUMENTS

| | | | | | |
|---|---|---|---|---|---|
| JP | 62021032 A | * | 1/1987 | | G01M 3/02 |
| JP | 63134931 A | * | 6/1988 | | G01M 3/28 |

*Primary Examiner* — David A Rogers
(74) *Attorney, Agent, or Firm* — Steven Kellner; William Steinberg; Jennifer Davis

(57) ABSTRACT

Embodiments of the present invention relate to detecting leaks in a fluid cooling system. One aspect of the present invention concerns an apparatus for detecting leaks in a fluid cooling system that includes a pressure exerting device for applying a pressure on a supply hose and a return hose of the cooling system, and a pressure gauge coupled to the pressure exerting device for detecting a drop of fluid pressure in the cooling system while the pressure is applied. The drop of fluid pressure indicates that there may be a leak in the cooling system.

20 Claims, 4 Drawing Sheets

(56) References Cited

U.S. PATENT DOCUMENTS

| | | | |
|---|---|---|---|
| 6,073,481 A * | 6/2000 | Barefoot | 73/49.5 |
| 6,116,082 A * | 9/2000 | Pride | 73/40.5 R |
| 6,209,560 B1 * | 4/2001 | Shaw | 137/14 |
| 6,314,794 B1 | 11/2001 | Seigeot | |
| 6,550,340 B1 * | 4/2003 | Barefoot | 73/756 |
| 7,254,434 B2 * | 8/2007 | Schulz et al. | 600/344 |
| 7,318,353 B2 | 1/2008 | Chadwell et al. | |
| 7,341,559 B2 * | 3/2008 | Schulz et al. | 600/309 |
| 7,415,887 B2 * | 8/2008 | Shpakow | 73/756 |
| 7,454,956 B1 | 11/2008 | LoPresti et al. | |
| 7,555,936 B2 | 7/2009 | Deckard | |
| 7,954,386 B2 | 6/2011 | Nanaji et al. | |
| 8,002,002 B2 * | 8/2011 | Knoll | 141/330 |
| 8,375,798 B2 * | 2/2013 | Anderson | 73/726 |
| 8,418,524 B2 * | 4/2013 | Al-Ali | 73/1.56 |
| 2003/0230148 A1 * | 12/2003 | Saxton | 73/732 |
| 2004/0118186 A1 * | 6/2004 | Shultis | 73/49.2 |
| 2005/0211024 A1 * | 9/2005 | Shpakow | 81/3.43 |
| 2007/0028675 A1 * | 2/2007 | O'Sullivan | 73/49.1 |
| 2007/0186681 A1 * | 8/2007 | Shkarlet et al. | 73/861.28 |

* cited by examiner

DETECTING LEAKS IN A FLUID COOLING SYSTEM BY SENSING FOR A DROP OF FLUID PRESSURE IN THE SYSTEM

BACKGROUND

Embodiments of the present invention relate generally to fluid cooling systems. More particularly, embodiments of the present invention relate to a device and method for detecting leaks of coolant in fluid cooling systems.

Fluid cooling is commonly used in electronics fabrication and material processing systems because a liquid cooling system is generally self-contained, relatively simple to set up, and can be extended to additional work stations as an operation increases in size. Typically, a fluid cooling system may include a network of rigid pipes and flexible hoses that contain a coolant such as water or a solution of water and glycol. The coolant may be circulated in the cooling system by one or more pumps installed in the system. Portions of the hoses or pipes may be adjacent to materials or media from which the heat is removed by the coolant. In some cooling systems, portions of the hoses or pipes containing the coolant may be submerged in a tank holding the liquid from which heat is removed by the coolant. Once the coolant absorbs the thermal energy from the liquid or material to be cooled, the heated coolant may go through a heat exchanger or radiator to discard the absorbed thermal energy. The coolant at the lower temperature is then returned to the cooling system to continue removing the heat from the liquid or material to be cooled in a closed loop system.

A fluid cooling system may develop leaks of coolant over time due to fatigue in the joints of the pipes and hoses, corrosion, or accidental damages to the pipes and hoses. Such leaks in the cooling system may disrupt the operation of the equipment being cooled by the cooling system or contaminate sensitive materials and components being processed or fabricated by the equipment. In order to temporarily maintain continuous operation of the cooling system, more coolant may need to be added to the cooling system to replace the leaked coolant.

Inspecting a cooling system to detect a leak is generally difficult due to the system's extensive network of pipes and hoses. Further, the operation of the equipment being cooled and the cooling system may need to be shut down in order to determine whether there is a leak in the cooling system.

It is thus desirable to have a device and method to quickly detect a leak in a fluid cooling system.

BRIEF SUMMARY

Exemplary embodiments of the present invention relate to an apparatus and method for detecting leaks in a fluid cooling system. The embodiments of the present invention may be implemented in a stand-alone leak detection device or incorporated into systems or equipment including fluid cooling systems that may develop leaks over time.

One aspect of the present invention concerns an apparatus for detecting leaks in a fluid cooling system that may include a pressure exerting device for applying a pressure on a flexible hose portion of the cooling system, and a pressure gauge coupled to the pressure exerting device for detecting a drop of fluid pressure in the cooling system while the pressure is applied. The drop of fluid pressure in the gauge indicates that there may be a leak in the fluid cooling system.

Another aspect of the present invention concerns a method for detecting leaks in a fluid cooling system that includes a supply valve and a return valve in the system's inlet and outlet, respectively. The method may include closing the return valve, applying a pressure exerting device on a flexible hose portion of the cooling system, wherein the pressure exerting device is coupled to a pressure gauge, closing the supply valve, and observing the pressure gauge for a drop of fluid pressure in the cooling system. The drop in the fluid indicates that there may be a leak in the fluid cooling system.

The details of the preferred embodiments of the present invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

The following detailed description provides certain example embodiments of the present invention. In this description, reference is made to the drawings wherein like parts are designated with like numerals throughout.

The present invention relates to devices and methods for detecting leaks in a fluid cooling system. Embodiments of the present invention may be implemented as stand-alone leak detection devices or incorporated into systems or equipment that include fluid cooling systems. For example, the embodiments may be incorporated into a semiconductor processing system that requires continuous cooling to remove heat from a reservoir containing a high-temperature fluid that drains from a washing step in a semiconductor processing operation. As another example, embodiments of the present invention may be integrated with alarm systems to inform operators of possible leaks in the fluid cooling systems.

One embodiment of the present invention includes a device for detecting leaks in a fluid cooling system. The cooling system may be configured to remove heat from heat-generating equipment such as a semiconductor scrubbing system. Although embodiments of the present invention are described in the context of a fluid cooling system for a semiconductor scrubbing system as an example, it will be appreciated by those skilled in the art that embodiments described herein may be applicable for detecting leaks in fluid cooling systems used with other equipment and systems that generate heat in their operation such as engines and machinery with moving parts.

Figure 1:
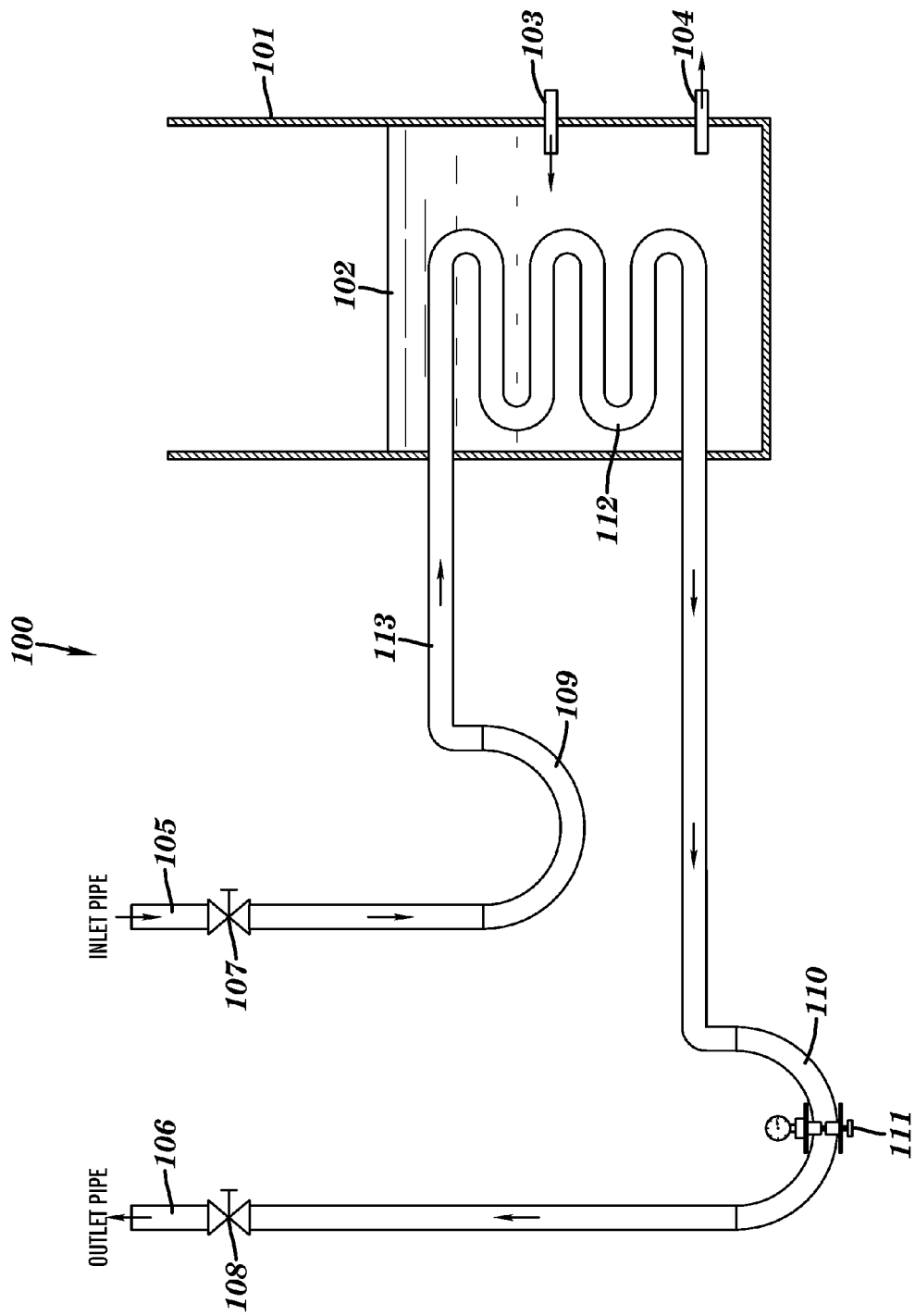
FIG. 1 is a diagram showing an example fluid cooling system to which embodiments of the present invention may be applied to detect leaks in the cooling system.

A semiconductor scrubbing system typically sprays water on the surface of a material that is being processed and currently at a generally high temperature to quickly lower the temperature of the material. The scrubbing water, which becomes generally warm after contacting the hot material, may flow into a holding tank below a scrubbing station. FIG. 1 illustrates such an example tank 101 for holding warm scrubbing water 102 that drains from a heat-generating source such as a scrubbing system (not shown). Waste in the holding tank 101 may be removed from the holding tank 101 through outlet 104. Make-up fluid may be added to the holding tank 101 through inlet 103.

A fluid cooling system 100 may be used to cool the generally warm scrubbing water 102 in the holding tank 101 so that the water 102 may be reused in the scrubbing process. The fluid cooling system 100 typically includes an inlet pipe 105 in which a cooling fluid 113 enters the cooling system 100 and an outlet pipe 106 through which the cooling fluid 113 exits the cooling system 100. The coolant fluid 113 in the cooling system 100 may be water, deionized water, or a solution of water and glycol. The fluid cooling system 100 may include a supply valve 107 and a return valve 108 for respectively turning off the flow of fluid in the inlet pipe 105 and outlet pipe 106 when it is necessary to stop the flow of the cooling fluid.

The fluid cooling system 100 may include flexible hose sections 109 and 110 as part of the inlet pipe 105 and outlet pipe 106, respectively, where a device 111 for detecting leaks in the cooling system 100 may be applied. The leak detection device 111 may be applied to another flexible hose portion in the fluid cooling system between the supply valve 107 and a return valve 108. The flexible hose sections 109-110 may be made of a high-temperature and reinforced rubber material. The fluid cooling system 100 may further include a heat exchanger 112 for extracting thermal energy from the scrubbing water 102 that is being cooled by the fluid cooling system 100. The heat exchanger 112 may include a generally long section of pipe or hose that is submerged in the scrubbing water 102 in holding tank 101 and configured in a serpentine pattern to maximize the contact surface between the cooling system 100 and the scrubbing water 102.

As the cooling fluid flows through the heat exchanger 112, the cooling fluid 113 is heated up by the generally warm scrubbing water 102 outside the heat exchanger 112 and thus lowering the temperature of the scrubbing water 102. The cooling fluid 113, now at a temperature higher than when it entered through inlet 105, exits the cooling system 100 through the outlet pipe 106. The temperature of the cooling fluid 113 that exits the cooling system 100 may then be lowered using another heat exchanger or radiator (not shown in FIG. 1).

Due to the continuous operation of the cooling system 100 at a generally high temperature, leaks may develop in the pipes, hoses, and connectors of the cooling system over time. These leaks may be caused, for example, by faulty seals or connections in pipes, hoses, and other components in the cooling system 100. Such leaks may require more fluid to be added to the cooling system 100 to replace the lost fluid, or even a shut-down of the cooling system 100 and the equipment that produces the scrubbing water 102 being cooled by the cooling system, in order to identify and repair the leaks.

Embodiments of the present invention may be used to quickly determine whether there may be a leak in the fluid cooling system 100 without the need for shutting down the equipment that generates the material being cooled, such as the scrubbing water 102. In one embodiment, a device for detecting leaks in the cooling system 100, as described with reference to FIGS. 2-7 may be applied to either flexible hose section 109 or flexible hose section 110 of the cooling system 100.

Figures 2, 3, 4, 5, 6:
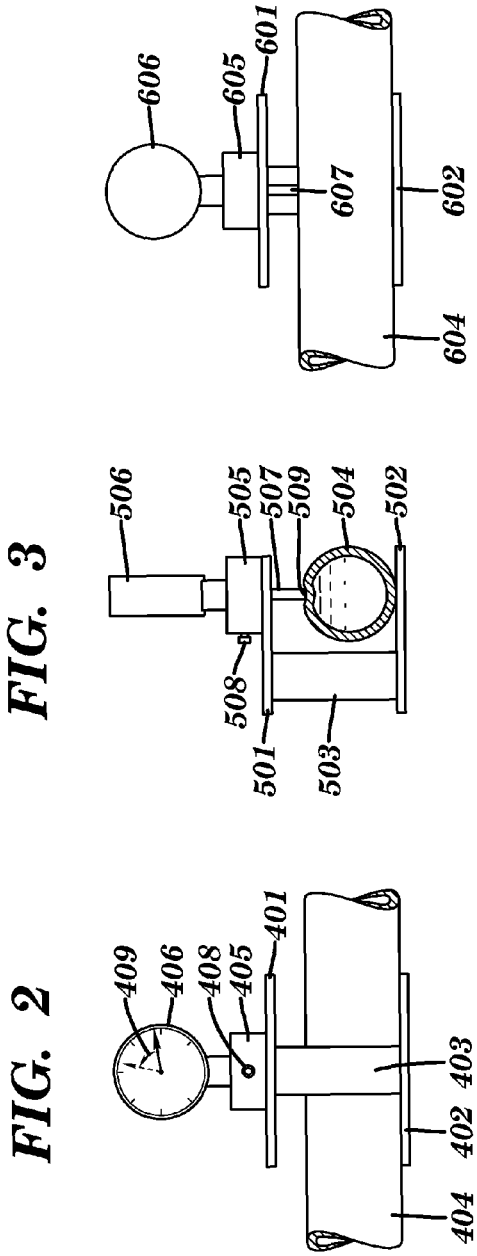
FIG. 2 illustrates a perspective view of a device for detecting leaks in a fluid cooling system, according to an exemplary embodiment of the present invention.
FIG. 3 illustrates a top view of a device for detecting leaks in a fluid cooling system, according to an exemplary embodiment of the present invention.
FIG. 4 illustrates a back view of a device for detecting leaks in a fluid cooling system, according to an exemplary embodiment of the present invention.
FIG. 5 illustrates a side view of a device for detecting leaks in a fluid cooling system, according to an exemplary embodiment of the present invention.
FIG. 6 illustrates a front view of a device for detecting leaks in a fluid cooling system, according to an exemplary embodiment of the present invention.

FIG. 2 illustrates a perspective view of a device 200 for detecting leaks in a fluid cooling system 100, according to an exemplary embodiment of the present invention. The leak detection device 200 may include a pair of clamps 201-202 for holding a portion of flexible hose 204 of the cooling system 100. The clamps 201-202 may be held together by a connecting block 203. The leak detection device 200 may include a block 205 attached to the top of the clamp 201 to accommodate a pressure gauge 206 and allow the pressure gauge 206 to be adjusted relative to and through block 205. The pressure gauge 206 may include a pressure sensing pin 207 which extends downward from the lower portion of the pressure gauge 206. The amount of pressure that the pressure sensing pin 207 exerts on the flexible hose section 204 may be varied by adjusting the position of the pressure gauge 206 relative to the block 205. The leak detection device 200 may include an adjusting mechanism for adjusting and locking the position of the pressure gauge 206 against the block 205, and thus adjusting and locking the pressure that the pressure sensing pin 207 exerts on the flexible hose section 204. An example of such an adjusting and locking mechanism is illustrated and described below with reference to FIG. 3.

FIG. 3 illustrates a top view of the device 200 for detecting leaks in a fluid cooling system 100, according to an exemplary embodiment of the present invention. In the illustrated top view, upper clamp 301 of the leak detection device 200 is shown above a flexible hose section 304 of the cooling system 100 which the device 200 is being applied to. Block 305 is attached to the top of upper clamp 301 and accommodates a pressure gauge 306. In one embodiment, the leak detection device 200 may further include a pressure adjusting screw 308 positioned in block 305 to allow a pressure sensing pin 207 of the pressure gauge 306 to be adjusted relative to the flexible hose section 304. Once a desired initial pressure on the flexible hose section 304 is established by moving the pressure gauge 306 against block 305, the screw 308 may be tightened to keep the pressure gauge 306 in a fixed position relative to the block 305. The pressure sensing pin 207 thus maintains the pressure level against the flexible hose section 304 at a fixed value at the start of the leak detection test.

FIG. 4 illustrates a rear view of the device 200 for detecting leaks in a fluid cooling system 100, according to an exemplary embodiment of the present invention. In the illustrated rear view, a flexible hose section 404 of the cooling system 100 is shown laying above the lower clamp 402 of the leak detection device 200. Clamps 401-402 of the leak detection device 200 may be held together by a connecting block 403. The leak detection device 200 may include a block 405 attached above the upper clamp 401 for accommodating a pressure gauge 406. The pressure sensing pin 207 of the pressure gauge 406 may extend from the pressure gauge 406 through block 405 and upper clamp 401 to reach the exterior surface of the flexible hose section 404. The pressure sensing pin of the pressure gauge 406 would sense the pressure of the fluid in the flexible hose section 404 during a leak detection test. If there is a leak of fluid in the cooling system 100, the pressure gauge 406 would indicate a drop 409 in the pressure of the fluid in the cooling system 100 after a brief waiting period, for example, of about 10 seconds.

FIG. 5 illustrates a side view of the device 200 for detecting leaks in a fluid cooling system 100, according to an exemplary embodiment of the present invention. Clamps 501-502, connecting block 503, block 505, adjusting screw 508, gauge 506, and pressure pin 507 of the leak detection device 200 are the same as those described with reference to FIGS. 2-4. The side view of the leak detection device 200 shows an initial deflection 509 in the flexible hose 504 of the cooling system 100. The initial deflection 509 corresponds to an initial pressure that the pressure sensing pin 507 of the leak detection device 200 exerts on the flexible hose section 504. The initial pressure may be set by adjusting screw 508 at block 505. If there is a leak of fluid in the cooling system 100, the pressure of the fluid inside the flexible hose 504 would drop from the initial fluid pressure after a brief waiting period, such as about 10 seconds. This drop in fluid pressure would be sensed by the pressure sensing pin 507 and indicated on the pressure gauge 506.

FIG. 6 illustrates a front view of the device 200 for detecting leaks in a fluid cooling system 100, according to an exemplary embodiment of the present invention. The leak detection device 200 includes an upper clamp 601 and a lower clamp 602 to receive a flexible hose 604 which is part of the fluid cooling system 100. The leak detection device 200 may include a block 605 that is attached to upper clamp 601 to accommodate a pressure gauge 606. The pressure sensing pin 607 lightly touches the exterior surface of the flexible hose 604 to sense an initial pressure of the fluid inside the flexible hose 604, as established by an adjustment of the pressure gauge 606 relative to block 605. A subsequent drop of fluid pressure in the flexible hose 604 after a brief waiting period would indicate a possible leak in the fluid cooling system 100.

Figure 7:
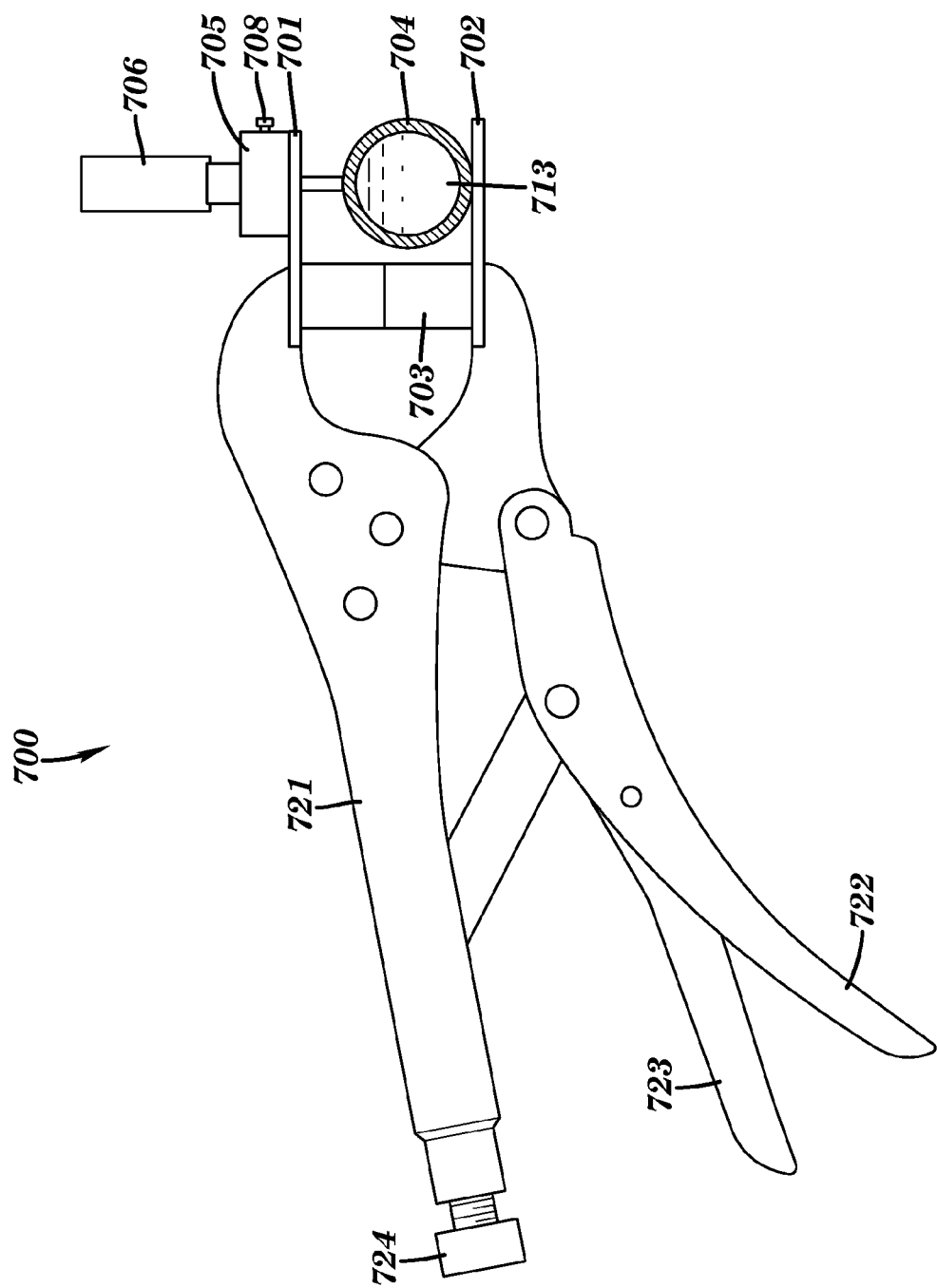
FIG. 7 illustrates a side view of a device for detecting leaks in a fluid cooling system, according to another exemplary embodiment of the present invention.

FIG. 7 illustrates a side view of a device 700 for detecting leaks in a fluid cooling system 100, according to another exemplary embodiment of the present invention. The leak detection device 700 may include a pair of handles 721 and 722 similar to those of a locking pair of pliers. The handles 721 and 722 are respectively attached to clamps 701 and 702. The clamps 701-702 may be held together by an adjustable connector 703. The adjustable connector 703 may include, for example, a spring-loaded mechanism for adjusting the space between the clamps 701 and 702 depending on a setting of an adjusting nut 724 at the end of the handle 721. The handle 722 may include a locking lever 723 to lock the handles 721 and 722 in a fixed position and to release the handles 721 and 722 from the locked position, similarly to the operation of a locking lever in a conventional pair of locking pliers.

The leak detection device 700 may include a block 705 positioned on the top of the upper clamp 701 to receive the lower portion of a pressure gauge 706. A pressure sensing pin 707 extends from the lower portion of the pressure gauge 706 and protrudes through clamp 701 to reach the exterior surface of flexible hose section 704. The tension that the pressure sensing pin 707 exerts on the flexible hose section 704 may be adjusted by sliding the pressure gauge 706 vertically through aligning holes in block 705 and clamp 701 until the pressure gauge 706 indicates a desired initial pressure. The position of the pressure gauge 706 relative to block 705 may then be locked in place by tightening a screw 708 in block 705 against the lower portion of pressure gauge 706.

If there is a leak of fluid from the cooling system 100, the pressure of fluid 713 in the flexible hose 704 would drop from the initially established pressure after a brief waiting period of time such as about 10 seconds. The drop of fluid pressure in the flexible hose 704 may be relatively small, for example, from 15 psi to 12 psi. The pressure gauge 706 would register such a drop in the fluid pressure in the cooling system 100.

In another embodiment of the present invention, a device for detecting leaks in a fluid cooling system as described with reference to FIGS. 2-7 may be coupled to an alarm to indicate that a leak has been detected in the fluid cooling system. The alarm may be an audible alarm, a visual alarm, or a remote device to inform an operator or a control system of the leak. In still another embodiment, a device for detecting leaks in a fluid cooling system may be coupled to a shut-off mechanism for temporarily shutting down the fluid cooling system if a leak is detected and considered relatively severe based on a predetermined level of fluid pressure drop in the cooling system.

Figure 8:
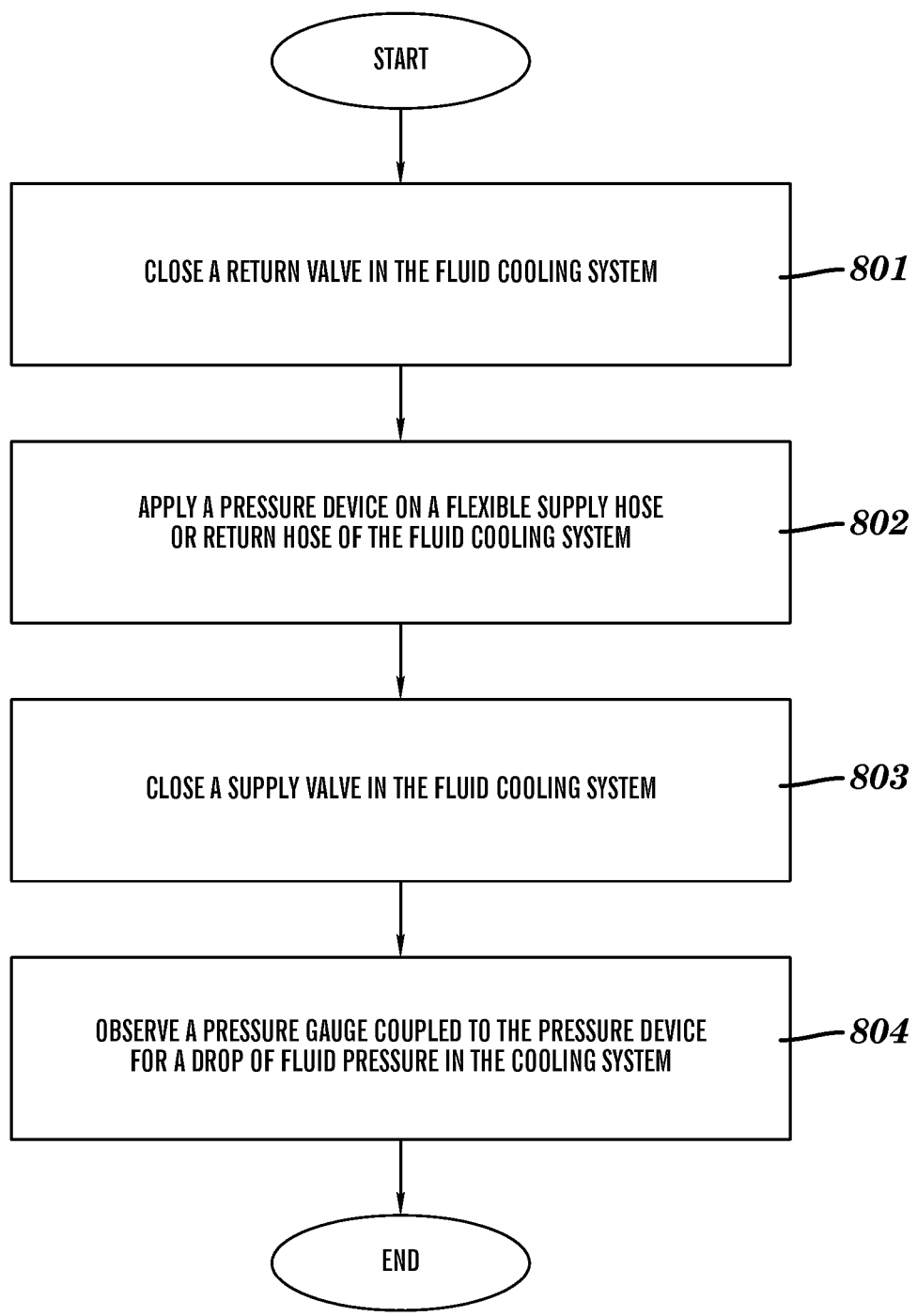
FIG. 8 is a flow chart of an exemplary process for detecting leaks in a fluid cooling system, according to an embodiment of the present invention.

FIG. 8 is a flow chart of an exemplary process for detecting a leak in a fluid cooling system, according to an embodiment of the present invention. In one application of a fluid cooling system 100, an operator may notice that make-up coolant needs to be added to the cooling system 100 to replace lost coolant more frequently than a normal schedule to replace coolant loss due to evaporation, for example. The operator may use a leak detection device 111 to determine whether a leak might have developed in the cooling system 100. At step 801, the operator may close a return valve 108 to shut off the flow of the cooling fluid in the outlet pipe 106. The operator may, at step 802, apply the leak detection device 111 to the flexible hose section 110 coupled to the outlet pipe 106, or the flexible hose section 109 coupled to the inlet pipe 105, to determine whether a leak of the fluid 113 may have developed in the cooling system 100.

The operator further closes the supply valve 107 to shut off the flow of the cooling fluid 113 in the inlet pipe 105, at step 803. Once the fluid in the cooling system 100 is isolated within the closed section of the cooling system 100 between the supply valve 107 and the return valve 108, the operator may observe a pressure gauge 206 attached to the leak detection device 111 for a possible drop of the pressure of the fluid in the cooling system 100. For example, the pressure gauge 206 might have a reading of 15 psi when the leak detection device 111 was first applied to either of the flexible hose sections 109-110, at step 801. After the supply valve 107 was turned off in step 803 and the operator waits for approximately 10 seconds, the pressure gauge 206 may now show a reading of 12 psi. The drop of 3 psi in the pressure of the cooling fluid indicates that there may be a leak in the cooling system 100 between the supply valve 107 and the return valve 108.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for detecting leaks in a flexible hose portion of a fluid cooling system, the apparatus comprising:
    a pressure exerting device for applying pressure on a flexible hose portion of the fluid cooling system;
    an upper clamp and a lower clamp located on opposite sides of the flexible hose portion, the lower clamp contacting the flexible hose portion and the upper clamp separated from the flexible hose portion by a space;
    a connector joining the lower clamp to the upper clamp; and
    a pressure gauge on a block located on the upper clamp and coupled to the pressure exerting device for detecting a drop of fluid pressure in the fluid cooling system while pressure is applied, the drop of fluid pressure indicating a leak in the fluid cooling system.

2. The apparatus of claim 1, wherein the applied pressure by the pressure exerting device is adjustable.

3. The apparatus of claim 1, wherein the pressure gauge comprises a pressure sensing pin extending through an entire thickness of the block, an entire thickness of the upper clamp, and touching an exterior of the flexible hose portion to sense the drop of fluid pressure.

4. The apparatus of claim 3, wherein the pressure exerting device and the pressure sensing pin are adjustable relative to the flexible hose portion to change the applied pressure.

5. The apparatus of claim 1, wherein the fluid cooling system comprises a supply hose and return hose, and fluid is prevented from flowing in the supply hose and the return hose while pressure is applied by the pressure exerting device.

6. The apparatus of claim 5, wherein the flexible hose portion is part of at least one of said supply hose and said return hose.

7. The apparatus of claim 1, wherein the fluid cooling system is used for cooling electronics fabrication equipment.

8. The apparatus of claim 1, further comprising an indicator coupled to the pressure device to generate a leak indication when a leak is detected.

9. The apparatus of claim 8, wherein the indicator is at least one of an audible alarm, a visible alarm, an alert sent to a remote device, or a meter.

10. A method for detecting leaks in a fluid cooling system having a supply valve and a return valve, the method comprising:
    closing the return valve;
    applying an apparatus on a flexible hose portion of the fluid cooling system, the apparatus having an upper clamp and a lower clamp located on opposite sides of the flexible hose portion, the lower clamp contacting the flexible hose portion and the upper clamp separated from the flexible hose portion by a space, a connector joining the lower clamp to the upper clamp, and a pressure gauge on a block located on the upper clamp and coupled to the pressure exerting device for detecting a drop of fluid pressure in the fluid cooling system while pressure is applied, the drop of fluid pressure indicating a leak in the fluid cooling system;
    closing the supply valve; and
    observing the pressure gauge for a drop of fluid pressure in the fluid cooling system, wherein the fluid pressure drop indicates a leak in the fluid cooling system.

11. The method of claim 10, wherein the pressure gauge is observed for approximately ten seconds.

12. The method of claim 10, wherein the fluid cooling system comprises a supply hose and a return hose, and fluid is prevented from flowing in the supply hose and the return hose while pressure is applied by the pressure exerting device.

13. The method of claim 10, further comprising re-opening the supply valve and the return valve after observing the pressure gauge for a drop in pressure.

14. The method of claim 10, wherein the pressure gauge comprises a pressure sensing pin touching the exterior of the flexible hose portion to sense the drop of fluid pressure.

15. The method of claim 10, wherein the pressure exerting device applies pressure of approximately 15 psi to the flexible hose portion.

16. The method of claim 10, wherein the fluid cooling system comprises a pressurized coolant.

17. An electronics fabrication system comprising:
    an electronics fabrication equipment;
    a fluid cooling system coupled to the electronics fabrication equipment for cooling the fabrication equipment; and
    an apparatus for detecting leaks in the fluid cooling system, the apparatus comprising an upper clamp and a lower clamp located on opposite sides of the flexible hose portion, the lower clamp contacting the flexible hose portion and the upper clamp separated from the flexible hose portion by a space, a connector joining the lower clamp to the upper clamp, and a pressure gauge on a block located on the upper clamp and coupled to the pressure exerting device.

18. The electronics fabrication system of claim 17, wherein the fluid cooling system comprises a supply valve and a return valve, and the apparatus for detecting leaks in the fluid cooling system comprises:
    closing the return valve;
    applying the pressure exerting device to the flexible hose portion;
    closing the supply valve; and
    observing the pressure gauge for the fluid pressure drop.

19. The electronics fabrication system of claim 17, wherein the pressure gauge comprises a pressure sensing pin touching the exterior of the flexible hose portion to sense the drop of fluid pressure.

20. The electronics fabrication system of claim 17, further comprising an indicator coupled to the apparatus to generate a leak indication, wherein the indicator is at least one of an audible alarm, a visible alarm, and an alert sent to a remote system.

* * * * *